(12) United States Patent
Naranjo et al.

(10) Patent No.: US 7,094,991 B2
(45) Date of Patent: Aug. 22, 2006

(54) ELECTRIC FOOD WARMING SYSTEM AND METHOD

(75) Inventors: Ivan J. Naranjo, Austin, TX (US); Pedro M. Ojeda, Round Rock, TX (US)

(73) Assignee: IJN International, Inc., Austin, TX (US)

( * ) Notice: Subject to any disclaimer, the term of this patent is extended or adjusted under 35 U.S.C. 154(b) by 0 days.

(21) Appl. No.: 10/807,045

(22) Filed: Mar. 22, 2004

(65) Prior Publication Data

US 2005/0006375 A1  Jan. 13, 2005

Related U.S. Application Data

(60) Provisional application No. 60/458,676, filed on Mar. 27, 2003.

(51) Int. Cl.
*A47J 37/08* (2006.01)
*A47J 37/00* (2006.01)

(52) U.S. Cl. ............... 219/385; 219/392; 219/386; 219/395; 219/428; 219/524; 99/377; 99/379; 99/391; 99/393; 99/448

(58) Field of Classification Search .......... 219/385, 219/386, 392, 394, 428; 99/391, 392, 393, 99/448, 427
See application file for complete search history.

(56) References Cited

U.S. PATENT DOCUMENTS

| | | | |
|---|---|---|---|
| 323,094 A | 7/1885 | Wolff | |
| 3,747,507 A | 7/1973 | McIntosh | |
| 3,880,064 A * | 4/1975 | Martinez | 99/349 |
| 4,664,025 A * | 5/1987 | Martinez | 99/331 |
| 4,782,745 A * | 11/1988 | George, Jr. | 99/483 |
| 4,901,631 A | 2/1990 | Russell et al. | |
| 4,972,767 A | 11/1990 | Russell et al. | |
| 4,987,827 A * | 1/1991 | Marquez | 99/331 |
| 5,570,625 A * | 11/1996 | Liebermann | 99/330 |
| 5,584,231 A * | 12/1996 | DeLeon | 99/332 |
| 5,735,191 A | 4/1998 | Russell et al. | |
| 5,765,471 A | 6/1998 | Monard | |
| 6,116,150 A | 9/2000 | Greenfield, Jr. | |
| 6,202,544 B1 * | 3/2001 | Martinez | 99/331 |
| 6,205,911 B1 * | 3/2001 | Ochoa | 99/331 |
| D442,423 S | 5/2001 | Monard | |
| 6,257,126 B1 * | 7/2001 | Veljkovic et al. | 99/349 |
| 6,288,369 B1 * | 9/2001 | Sherman | 219/405 |

(Continued)

FOREIGN PATENT DOCUMENTS

CA   950523   7/1974

(Continued)

*Primary Examiner*—Joseph M. Pelham
(74) *Attorney, Agent, or Firm*—Thelen Reid & Priest LLP

(57) ABSTRACT

A device is disclosed for warming tortillas and other foods. The device operates with a standard electric alternating current ranging from 110 to 120 volts in the US and 220v–240v in other countries. This appliance is to be used in homes or in businesses for the purpose of warming either corn or flour tortillas in quantities ranging from one up to six at a time.

The electric current provides energy to heater elements located within the unit and thus provide the heat necessary to warm the tortillas placed on a plurality of circular loading trays. The loading trays are specially designed to lock-in-place in the open and closed positions and are designed to work with a vertical pivot tube which allows the loading trays a pivot-swivel action for efficiency in the loading and unloading of tortillas.

9 Claims, 17 Drawing Sheets

U.S. PATENT DOCUMENTS 6,467,400 B1 * 10/2002 Raio et al. .................... 99/349

FOREIGN PATENT DOCUMENTS

| CA | 950522 | 5/1991 |
| CA | 1284342 | 5/1991 |
| EP | 0355992 | 7/1989 |
| JP | 2119825 | 5/1990 |

* cited by examiner

ELECTRIC FOOD WARMING SYSTEM AND METHOD

REFERENCE TO RELATED APPLICATION

This application claims priority to U.S. Provisional Patent Application Ser. No. 60/458,676 filed Mar. 27, 2003.

FIELD OF THE INVENTION

The present invention relates to a device and method for warming food. More particularly, the present invention relates to a kitchen appliance to warm thin, circular foods such as tortillas.

BACKGROUND OF THE INVENTION

Tortillas are often made in relatively large quantities and then refrigerated for consumption later. Although tortillas may be eaten cold, normally before a meal the tortillas are warmed which significantly enhances their flavor and texture. To heat tortillas there is presently one primary method, namely to heat them on a hot metal surface such as a griddle or frying pan. In Mexico, the use of a heavy iron skillet called "el comal" is the traditional and proven way of warming tortillas because this method achieves the best flavor and quality for warming corn and flour tortillas. Cooks using el comal and other conventional methods are aware that corn tortillas normally should be heated longer than flour tortillas.

Some drawbacks of using el comal and other conventional methods are that they are very time consuming, demand constant human supervision to assure quality and safety, and require the use of a "comal" or pan plus an external source of heat such as a stove or fire. Other methods exist such as by warming tortillas in a microwave, convection oven, or directly on top of a stove burner or a grill. However, these methods also require constant supervision; some are unsafe due to the danger of causing fire, and all are found unreliable in producing consistent results in flavor and quality for the warming of corn and flour tortillas.

In a home all members of the family normally eat at the same time and therefore it is preferable to heat a number of tortillas at once. Similarly, in a restaurant it is often desirable to heat many tortillas at the same time.

However, in a home environment the surface area for heating tortillas is limited and often may not be sufficient to heat enough tortillas for all members of the family at the same time. In a restaurant, depending on the circumstances there may at times be insufficient space to heat enough tortillas to meet the customer's requirements at a particular time.

A possible solution to the problem of heating a large number of tortillas simultaneously is a certain type of large capacity toaster. For example, U.S. Pat. No. 6,116,150 describes a "multi-level toaster". The multi-level toaster described in the patent consists of a vertically extending, cylindrical structure having a plurality of modules which may be integrally joined together in a single housing or may be stacked separately one upon the other. Each module comprises at least one heating unit having a horizontally oriented aperture opening into the unit. Accordingly, it would be possible to heat tortillas in the multi-level toaster. However, the multi-level toaster has serious shortcomings if used as a tortilla warmer. For example, in the multi-level toaster each heating unit is separated from its vertical neighbors by a heat insulating layer and includes a food receiving grill, an upper heating element located above the grill, and a lower heating element located below the grill. Thus if a tortilla were heated on a grill, for each tortilla two heating elements would be required.

As yet another example of a shortcoming of the multi-level toaster if it were used as a tortilla warmer, it should be understood that air pockets trapped in tortillas can inflate the tortilla during heating. This could result in parts of the tortilla contacting the heating element which might burn the tortilla and create an unsafe condition by causing a risk of fire. Yet another example of a shortcoming of the multi-level toaster if it were used as a tortilla warmer, it should be understood that if a batch of tortillas are warmed at the same time then it is desirable to remove all of the tortillas from the heating device at the same time. However, although the multi-level toaster includes a mechanism to permit the removal of a plurality of slices of toast at the same time, the mechanism is complex, appears significantly expensive from a manufacturing standpoint, and is apparently less than completely practical or desirable from a functional perspective.

OBJECTS AND SUMMARY OF THE INVENTION

An object of the present invention is to provide a device and method to heat a plurality of tortillas at the same time.

Another object is to provide a device for heating tortillas which minimizes the number of heating elements in the device.

Another object is to provide a device for heating tortillas which includes means to reduce or eliminate the likelihood that a tortilla will be burned when it is being warmed.

Another object is to provide a device for heating tortillas which includes a system to permit a cook to easily place a plurality of tortillas in the device at the same time and to easily remove the plurality of tortillas at the same time.

The present device operates with a standard electric alternating current ranging from 110 to 120 volts in the US and 220v–240v in other countries. This appliance is to be used in homes or in businesses for the purpose of warming either corn or flour tortillas in quantities ranging from one up to six at a time. However, it should be understood that the device can be used to warm other thin, relatively flat foods such as pita bread.

The electric current provides energy to heater elements located within the unit and thus provide the heat necessary to warm the tortillas placed on a plurality of circular loading trays. The loading trays are designed to work with a vertical pivot tube which allows the loading trays a pivot-swivel action for efficiency in the loading and unloading of tortillas. The device includes a control unit with selector buttons and switches programmed with default settings based on taste tests and specifically designed for the warming of corn or flour tortillas. Additional options in the control unit allow for default settings designed for the warming of one to six tortillas at a time. An additional selector for the individual user to adjust the heating period is also designed within the control unit. Once the tortillas are loaded and the selections are made in the control unit, a button or switch for "start" and "off" will turn the unit on for the warming cycle or will shut the unit off.

After the warming cycle is complete, a beep tone or other sound will inform the user that the tortillas are warm and ready.

BRIEF DESCRIPTION OF THE DRAWINGS

The accompanying drawings, which are incorporated into and constitute a part of this specification, illustrate embodiments of the present invention and, together with the detailed description, serve to explain the principles and implementations of the invention.

In the drawings.

DETAILED DESCRIPTION

Embodiments of the present invention are described herein in the context of an electric food warmer. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
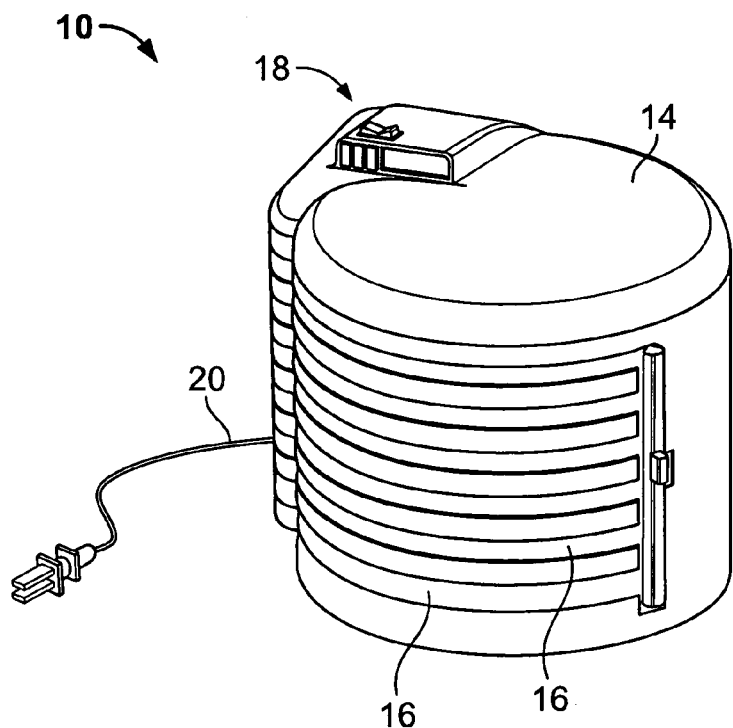
FIG. 1 is a front view of the tortilla warmer according to one embodiment of the present invention, with the trays in the closed position.
Figure 2:
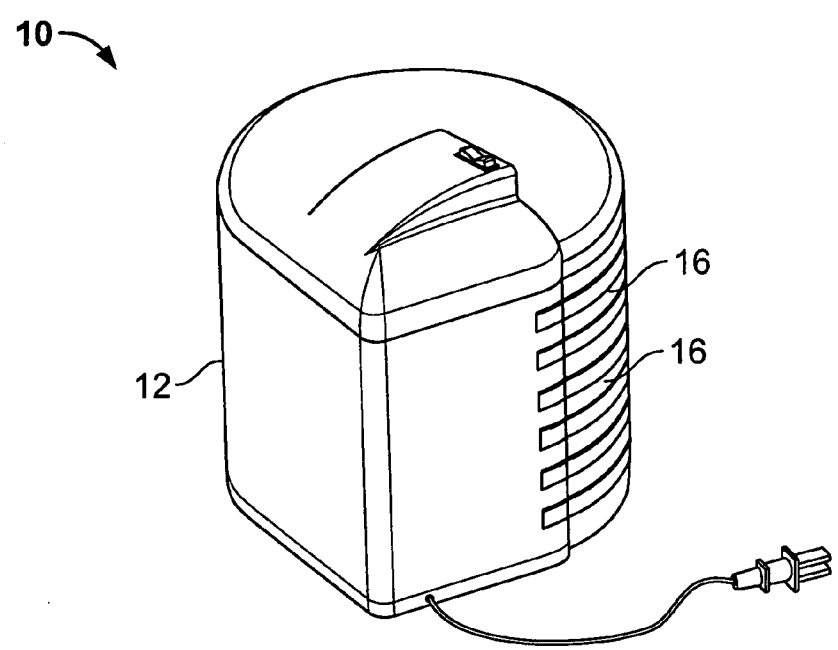
FIG. 2 is a rear view of the tortilla warmer of FIG. 1

FIGS. 1 and 2 are the front and back views, respectively, of one embodiment of the tortilla warmer 10 of the present invention. The tortilla warmer 10 comprises a generally cylindrical housing 12 which has a substantially flat top 14 and a plurality of trays 16, which are in the closed position. A control panel 18 is located on the top 14, and a power cord 20 is used to supply electric power to the device.

Figure 3:
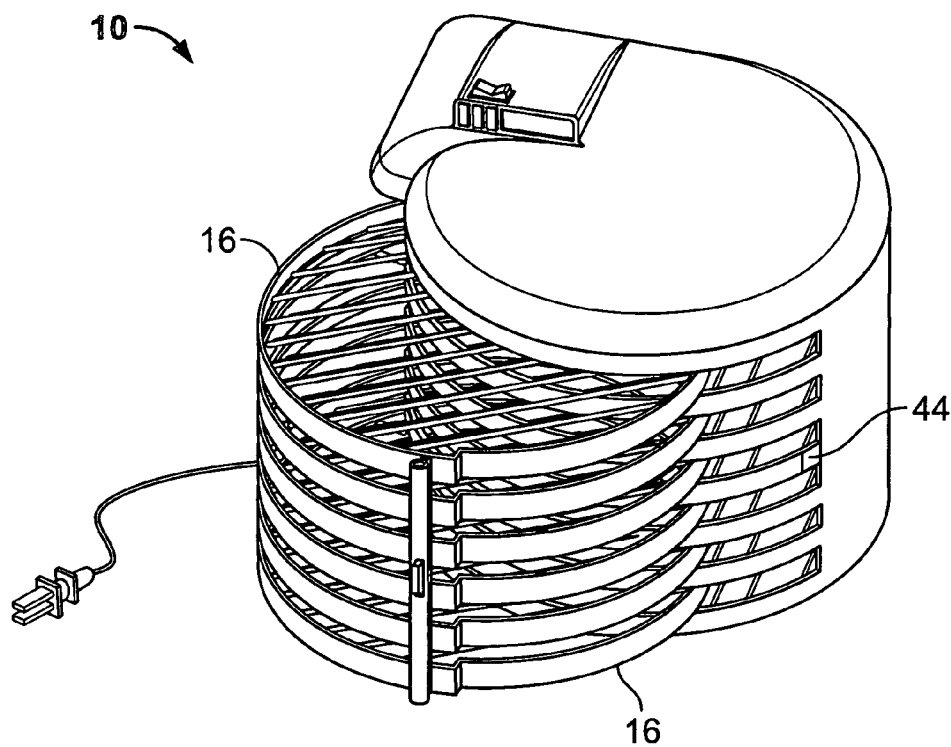
FIG. 3 is a front view of the tortilla warmer according to FIG. 1 in the open position.
Figure 4:
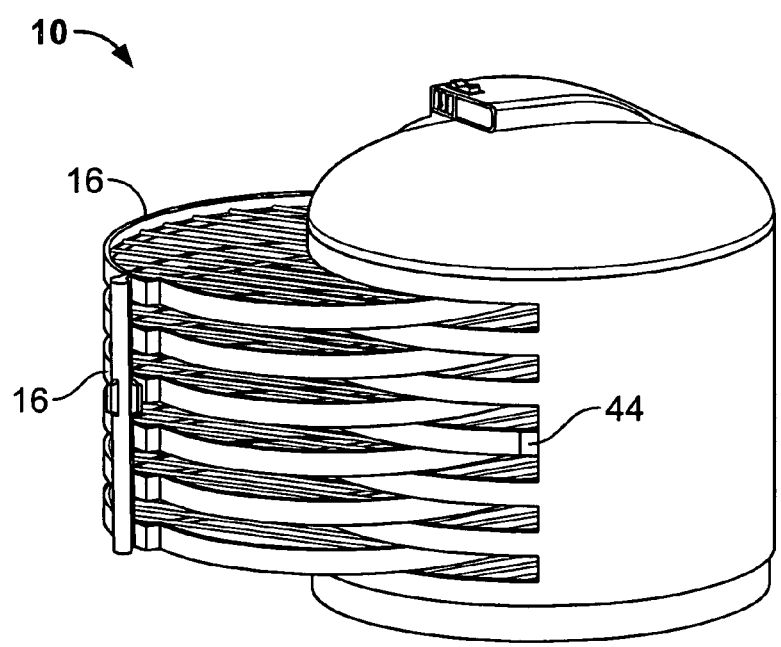
FIG. 4 is a side view of the tortilla warmer of FIG. 3.

FIGS. 3 and 4 show the tortilla warmer 10 with the trays 16 in the open position for loading tortillas. A handle 24 is substantially rod shaped and connects to each of the trays 16 so that a user can hold the handle 24 and move all of the trays together simultaneously. When the trays are in the open position as shown in FIGS. 3 and 4 a cook can place one tortilla on each of the trays 16.

Figure 5:
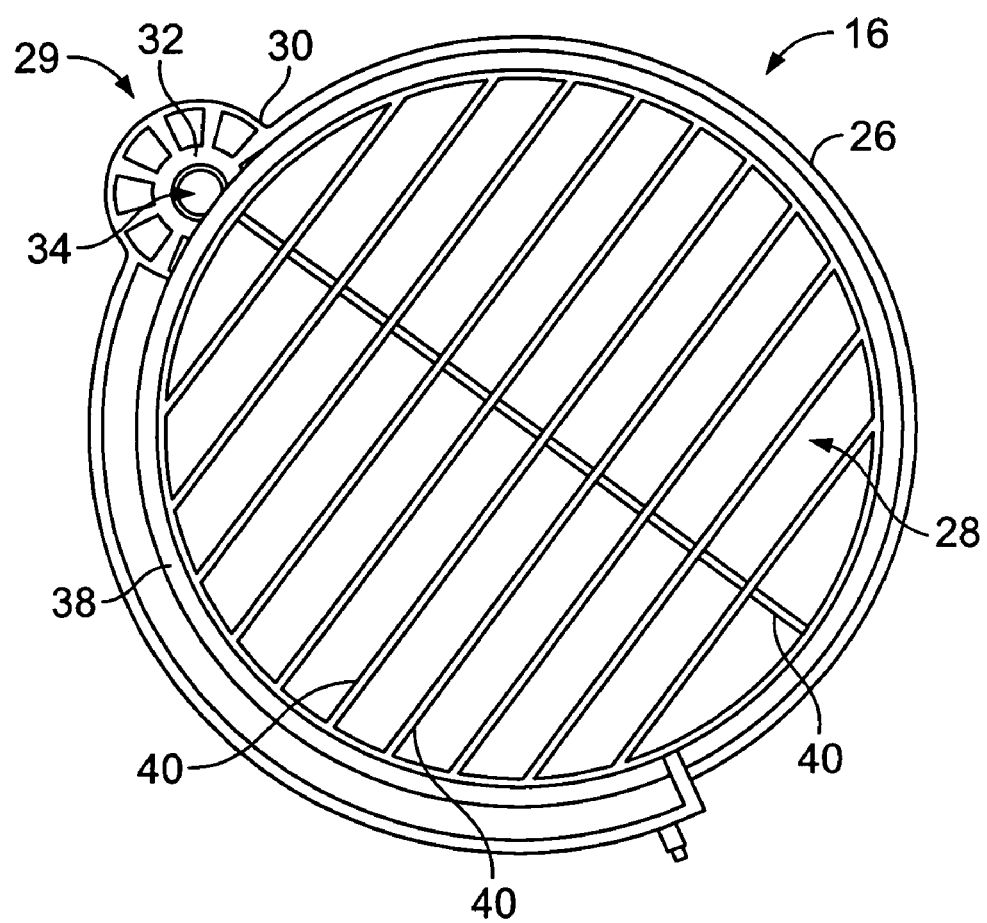
FIG. 5 is a top view of one tray of the device of FIG. 1.
Figure 6:
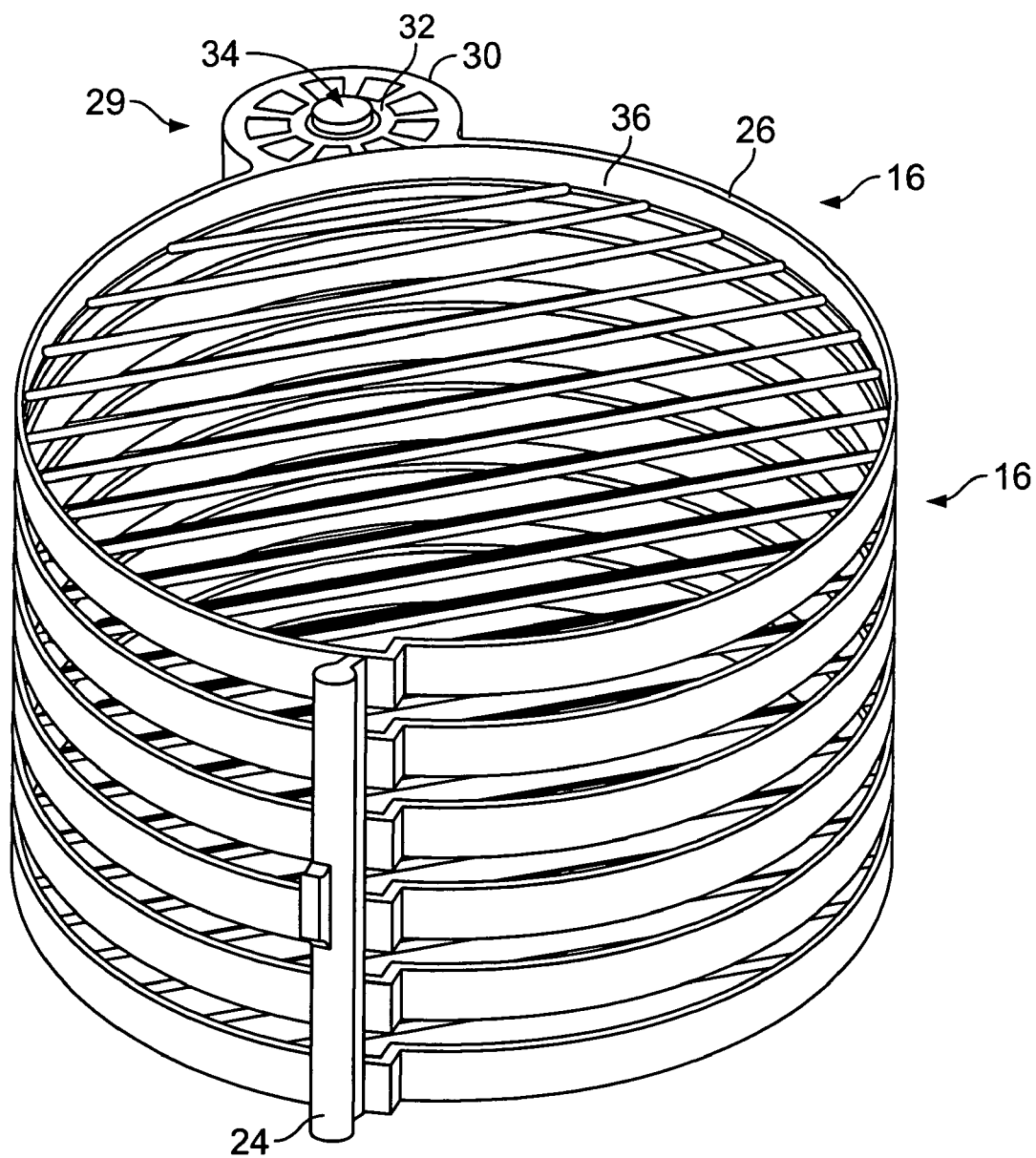
FIG. 6 is a top view of the trays of the device of FIG. 1.

FIG. 5 shows one tray 16, which comprises a circular support member 26 and a grill 28. The support member 26 has a connector member 29 coupled to one edge of the support member, and the connector member 29 has a circular outer part 30 and a curricular inner part 32, and the inner part includes a cylindrical hole 34. The support member 26 includes a flange 36 around its inner periphery to support the grill 28 so that the grills can be lifted off the support members 26 and removed from the device for cleaning. Each grill 28 comprises a circular outer member 38 and a plurality of parallel, straight members 40 which are spaced apart from each other and have their ends connected to the circular outer member 38. As shown in FIG. 6 a plurality of trays 16 are located one above the other and spaced apart from one another.

Figure 6A:
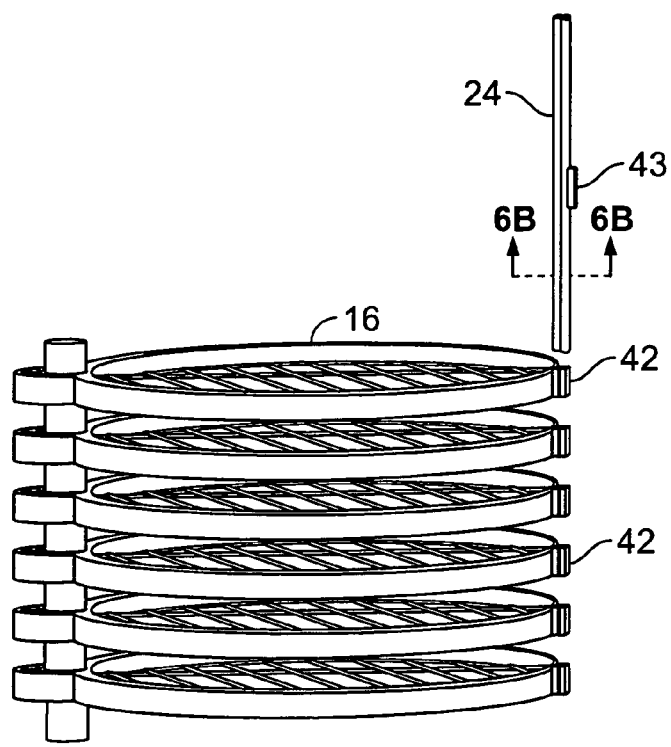
FIG. 6a is a side view of the trays of the device of FIG. 1.
Figure 6B:
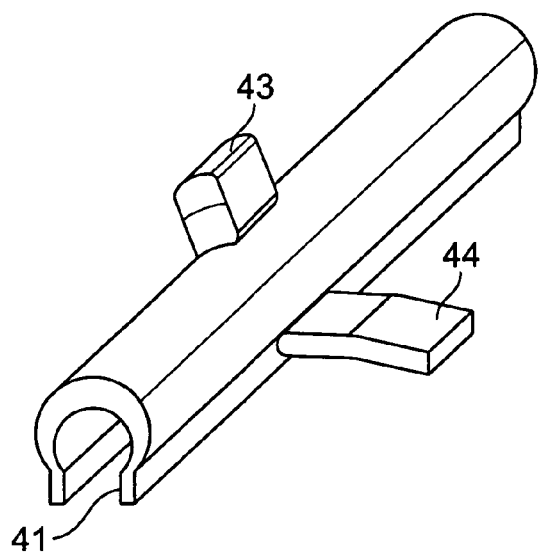
FIG. 6b is a sectional view of a part of the handle of the device of FIG. 6a taken along line 6b—6b.

FIGS. 6a and 6b illustrate the operation of the handle 24. The handle 24 is substantially rod shaped and includes a slot 41 formed along most of its length, with the exception of the uppermost part of the handle. The slot cooperates with flanges 42 which are formed on each of the trays 16 so that the handle can be removed (FIG. 6a) to enable to a user to rotate each tray separately, or the handle can be engaged with the flanges 42 by sliding it downward over the flanges. When the handle 24 is engaged with the flanges 42, a user can rotate all the trays 16 together by gripping a member 43. Also connected to the handle 24 is a sensor plate 44 which can be sensed by a proximity sensor 44 located in the housing 12 to determine whether the trays are open or closed.

Figure 7:
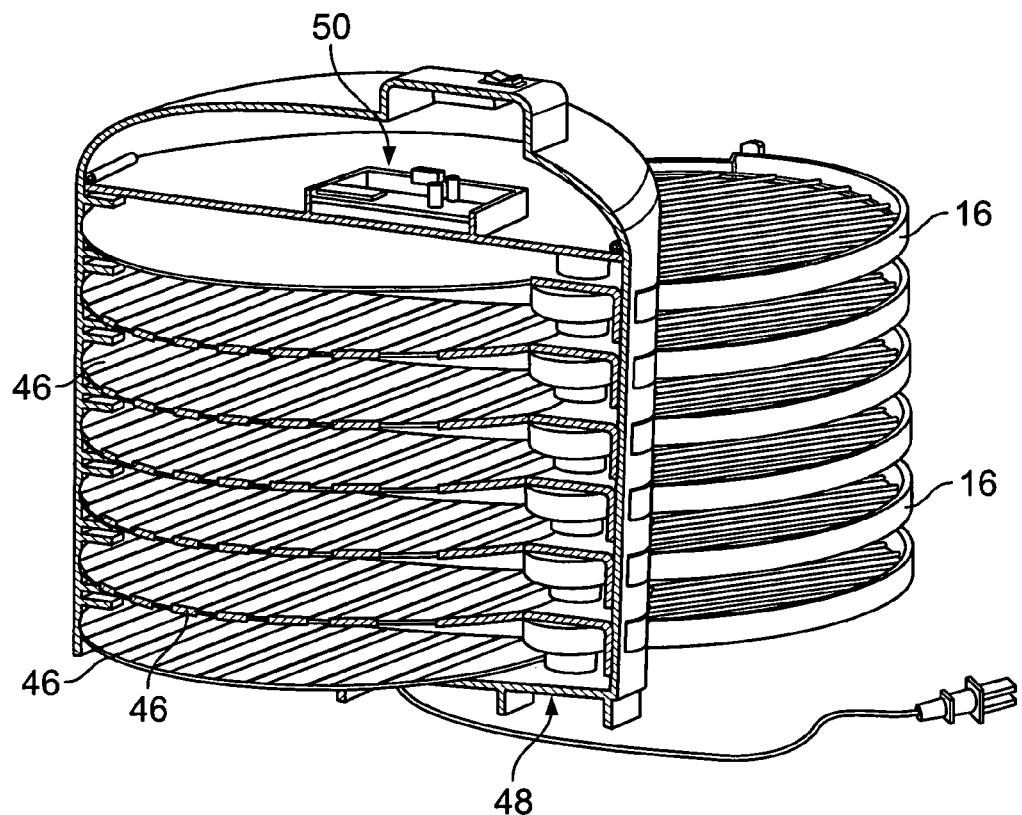
FIG. 7 is a view of the device of FIG. 1 with the back removed.

In FIG. 7 the device is shown with the back removed. Heating elements 46 are shown, and each heating element 46 is mounted to a vertical support column 48. Electronic power and control components 50 are mounted to a flat plate 52 located beneath the top 14 and above the uppermost heating element 46.

Figure 8:
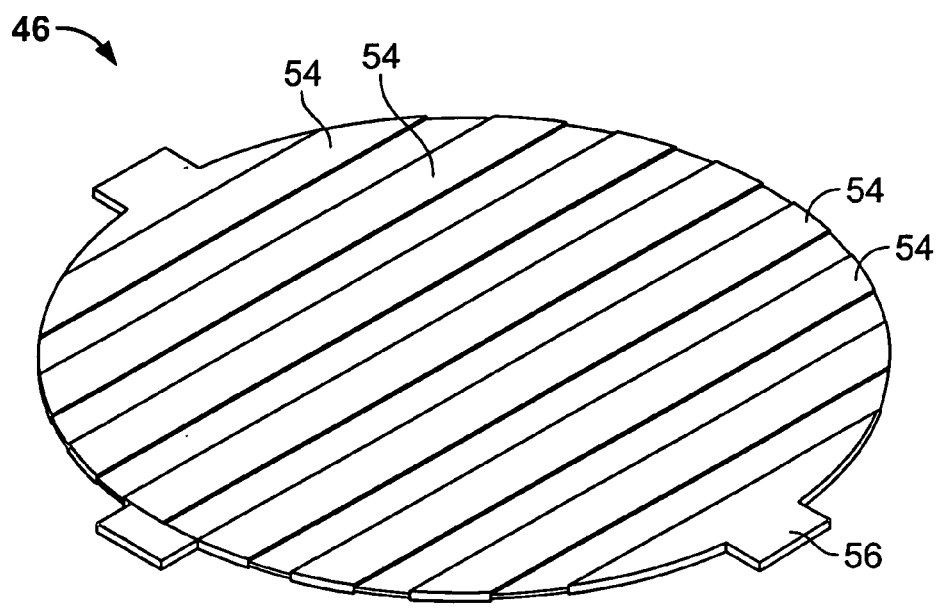
FIG. 8 is a top view of one heating element of the device of FIG. 1.

FIG. 8 shows one heating element 46. There are seven heating elements 46 in the device. Each heating element 46 is comprised of two components: a resistive element 54 and a phenolic plate 56. The resistive element 54 is a readily available, widely used, flat ribbon, Ni-chrome element. The phenolic plate 56 is a thermally resistant, electrically non-conductive material that is rigid and durable. The plate 56 is substantially circular and has notches cut into the perimeter to allow for the resistive element 54 to be wrapped around the plate 56. These wraps will be referred to as turns.

The topmost and bottom-most heating elements 46 are referred to as single sided. This configuration has the resistive element 54 located on only one side of the plate so that the thermal output in the single sided configuration occurs primarily in one direction. The middle five heating elements 46 are double-sided and have the resistive element 54 on both sides of the plate 56. This configuration results in heating in two opposite directions. Thus it can be seen that the food on a tray 16 is simultaneously heated from both above and below by thermal radiation from two heating elements 46.

It should be understood that thermal uniformity in the heating chamber is desirable to ensure a consistent heating from the topmost food item to the bottom-most food item. In some cases the tendency for heat to accumulate at the top of the chamber may require variations in thermal output of individual heating elements 46. Varying thermal output from one heating element to another can be accomplished by methods known in the art. For example, varying thermal output can be produced by varying the number of turns or length of the resistive element at each heating element 46, or by controlling the amount of current into each heating element 46.

Figure 9:
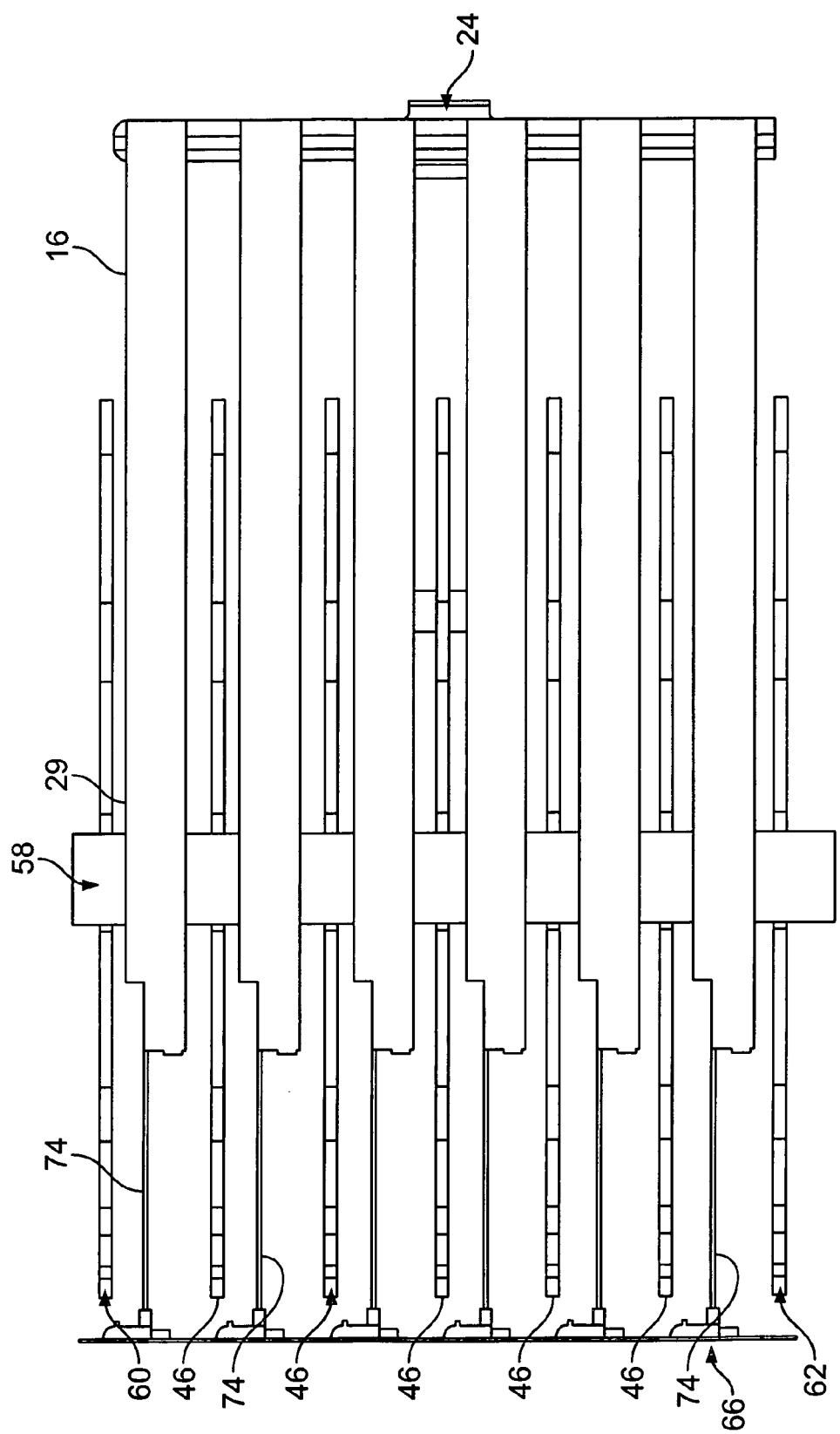
FIG. 9 is a view of the internal structure of the device of FIG. 1.

Turning to FIG. 9, a cut away view of the device is shown. The heating elements 46 are mounted to a vertical support column 48. An upper heating element 60 is located at the top of the device, and the upper heating element 60 is single sided in that the resistive element 54 is on the bottom of the phenolic plate 56 to direct heat primarily downward. Similarly, the lowest heating element 62 is located at the bottom of the device and is single sided in that the resistive element 54 is only on the top of the phenolic plate 56 to direct heat primarily upward. The other five heating elements 46 are double-sided and have resistive elements on both their top and bottom sides. A vertical pivot tube 58 is mounted to the housing 12, and connector members 29 of the trays 16 are connected to the pivot tube.

Figure 10:
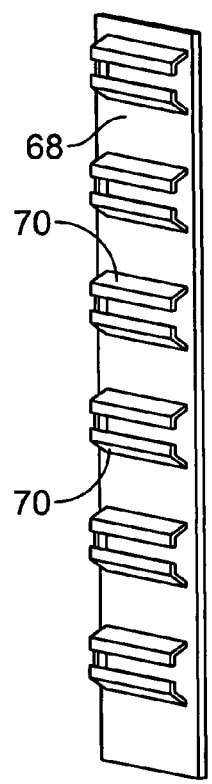
FIG. 10 is a view of one component of the compression grill system of the device of FIG. 1.
Figure 11:
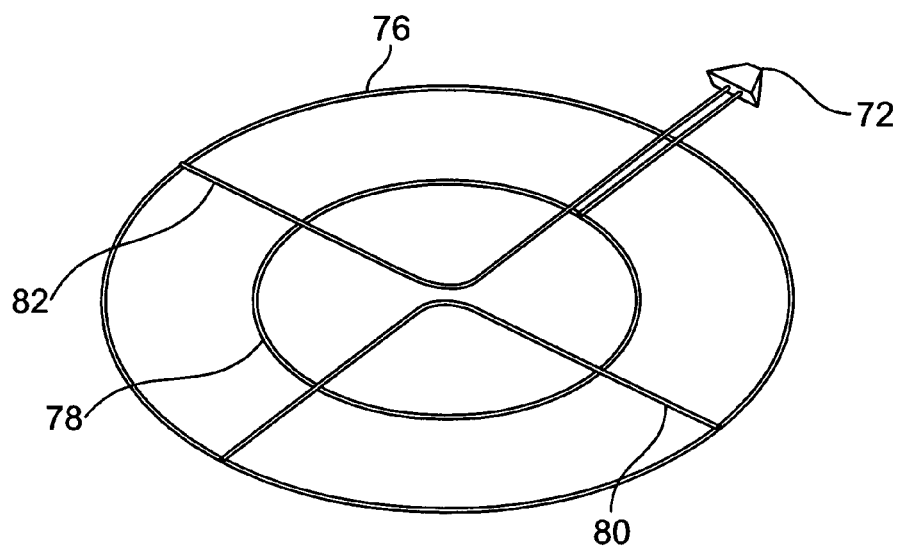
FIG. 11 is a view of another component of the compression grill system of the device of FIG. 1.
Figure 12:
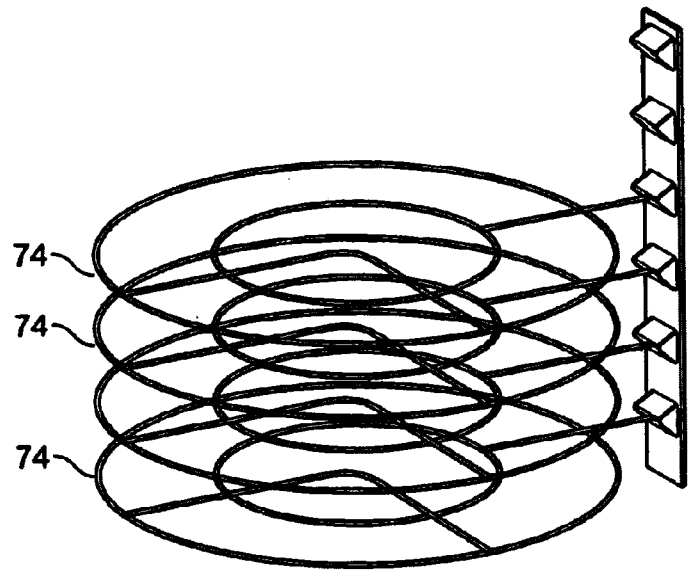
FIG. 12 is a view of the compression grill system of the device of FIG. 1.

A compression grill assembly 66 is shown in FIGS. 10–12. The compression grill assembly 66 comprises a mounting bracket 68 which is connected to the housing 12. The mounting bracket 68 includes six flanged slots 70 formed to accommodate mounting members 72. The compression grill assembly 66 also includes six compression grills 74, each of which has two rings 76 and 78, and the rings 76 and 78 are connected to members 80 and 82 which connect the rings to each other and to the mounting member 72. The cooperation of flanged slots 70 and members 72 permits a user to remove the grills 74 from the device for cleaning.

It can be seen from FIG. 9 that one compression grill 74 is located immediately above each tray 16 when the trays are in the closed position. It should be understood that air pockets trapped in tortillas can inflate the tortilla during heating. The proximity of the heating elements to the tortilla does not allow significant room for inflation. The compression grills 74 force the tortilla to remain relatively flat. The compression grills 74 ensure that the tortilla can be easily removed and that it does not touch the heating elements.

Figure 13:
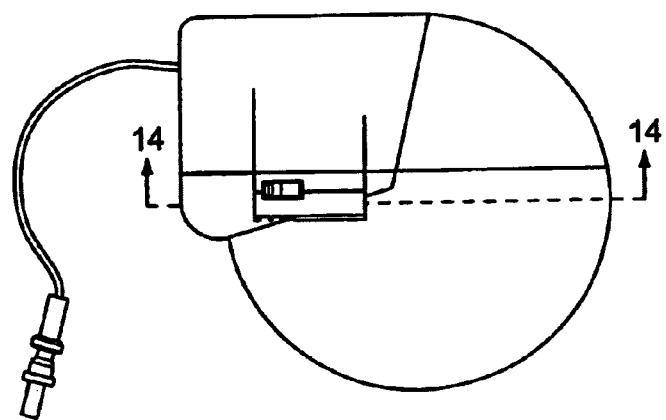
FIG. 13 is a top view of the device of FIG. 1
Figure 14:
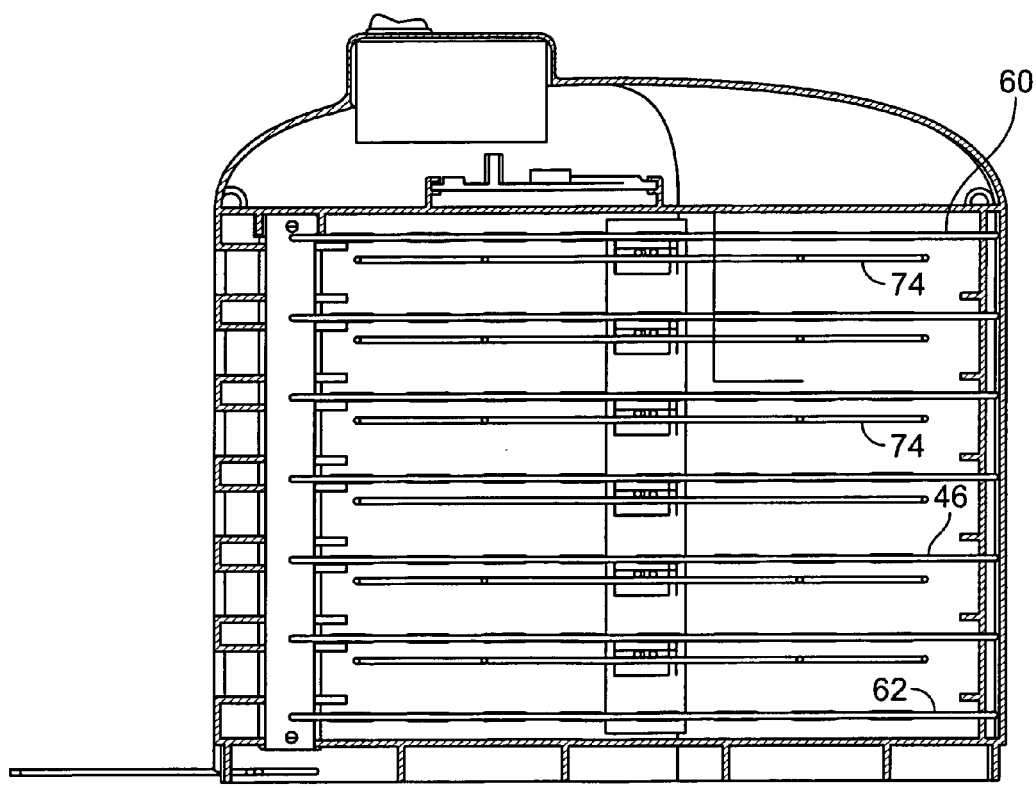
FIG. 14 is a cut-away side view of the device of FIG. 13, taken along the line 14—14.
Figure 15:
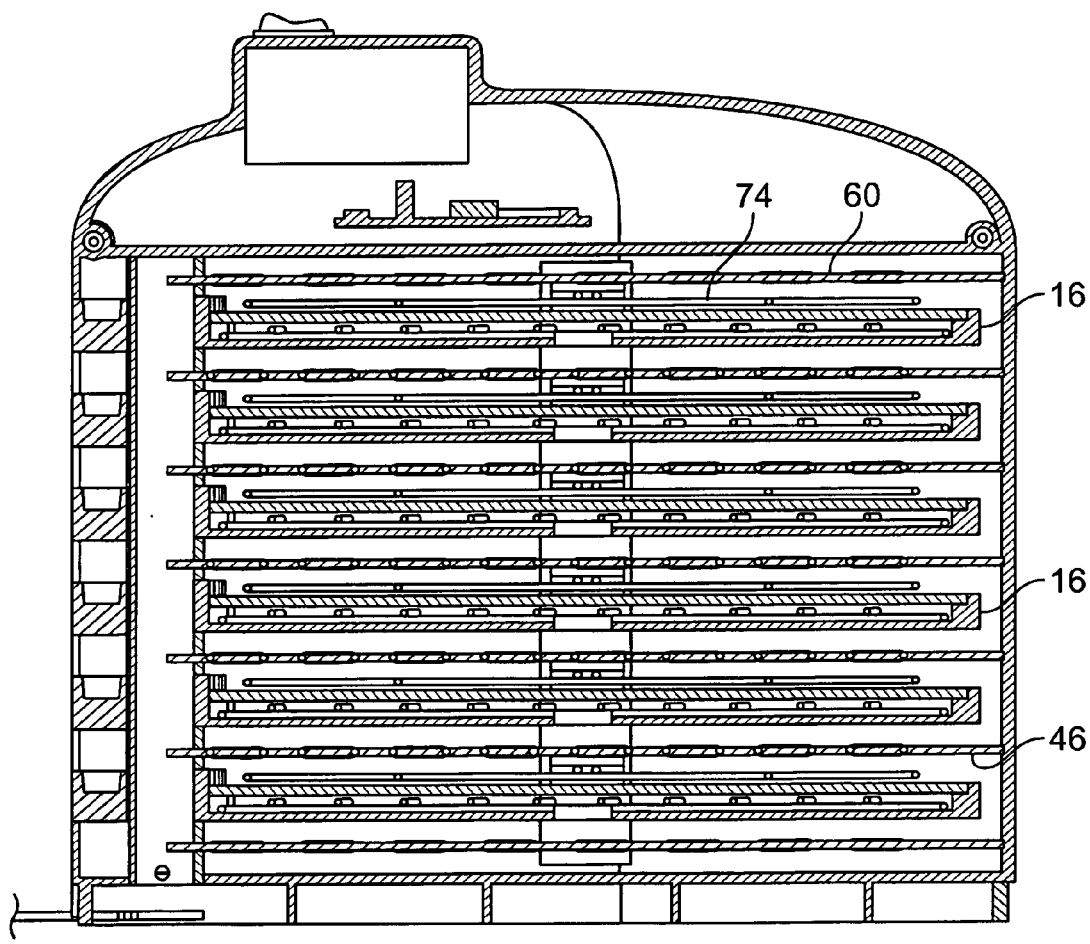
FIG. 15 is another cut-away side view of the device of FIG. 13, taken along the line 14—14.

FIG. 13 shows a top view of the device. FIGS. 14 and 15 show sectional views of the device taken along line 14—14 in FIG. 13. FIG. 14 shows the device without the trays 16, and FIG. 15 shows the device with the trays 16.

The operation of the device can now be understood. The trays 16 are all simultaneously swung to the open position (shown in FIGS. 3–4) and thin foods are loaded onto the trays 16. The trays 16 are swung by pivoting around the pivot tube 58. Although all trays 16 are capable of swinging independently, they share a common handle 24. The handle 24 allows the user one single point of control that eliminates having to open and close all six units individually.

The handle 24 also contains features that allow the control circuitry to sense when the trays are in the open or closed position. The feedback is done through a contact or proximity sensor 44, and is intended as a safety feature as well as means to ensure a better heating environment.

The handle 24 can be removed which allows all trays 16 to move in a radial fashion independently. The removal of the handle is necessary in the event that a tray may need to be cleaned or replaced.

The pivot tube 58 is designed to also be removable and has features to lock the tube in place. The pivot tube 58 would be removed only to replace or clean a tray 16.

The trays 16 contain removable grills 28. This grill 28 snaps into place and is removable for cleaning and may be Teflon coated to eliminate sticking.

Figure 16:
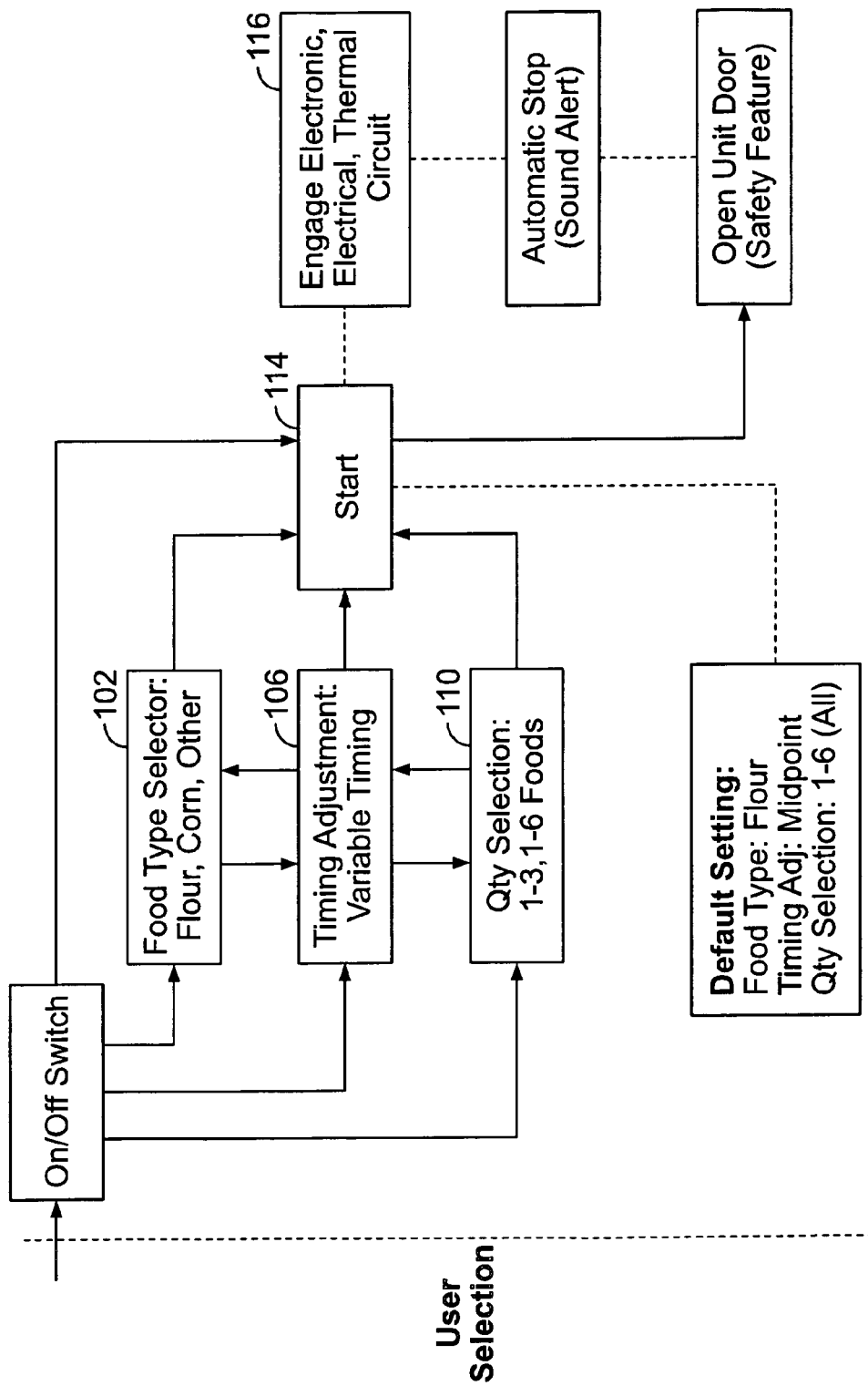
FIG. 16 is a flow chart illustrating the operation of the device of FIG. 1.
Figure 17:
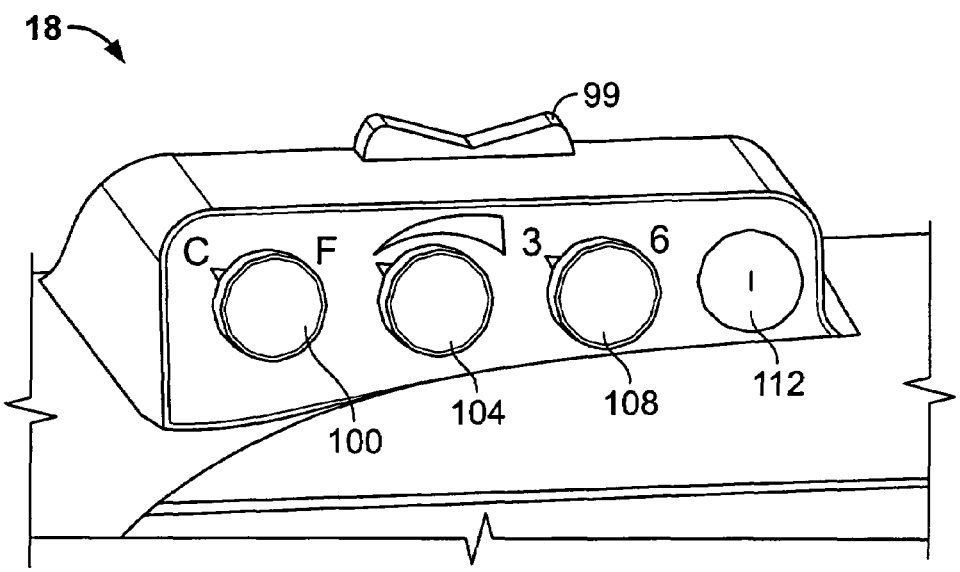
FIG. 17 illustrates the control panel of the device of FIG. 1.
Figure 19:
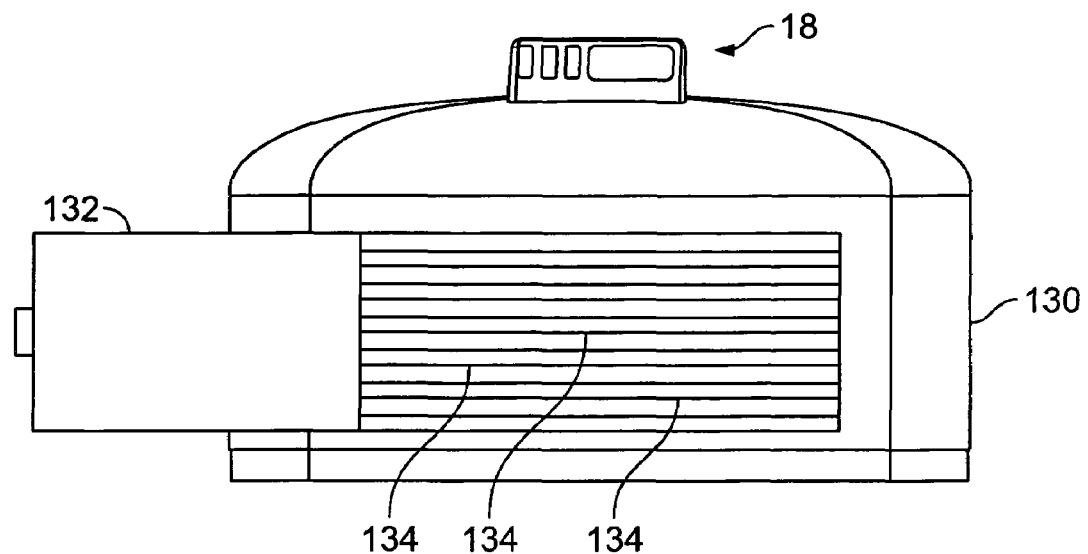
FIG. 19 is a front view of an alternative embodiment of the tortilla warmer for conductive heating, in the open position.
Figure 20:
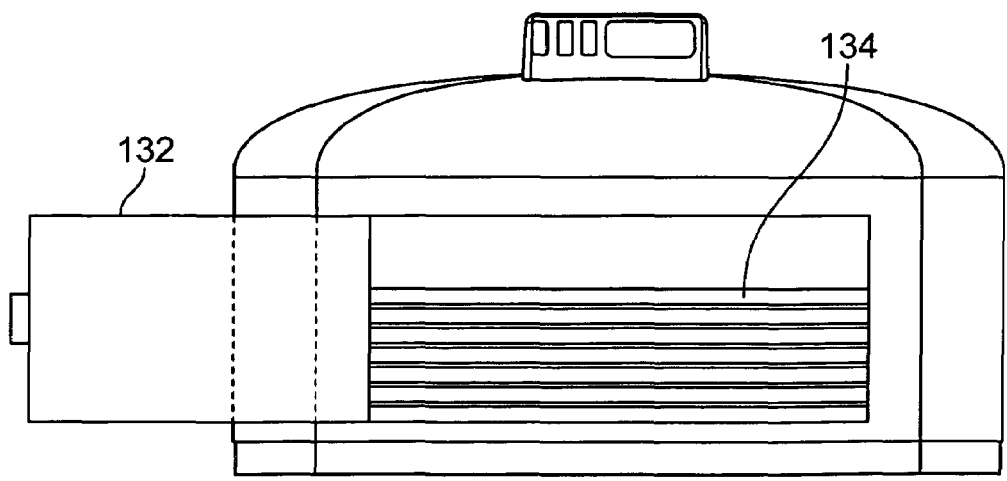
FIG. 20 is a front view of the embodiment of the tortilla warmer shown in FIG. 19, in the closed position.

Once the foods have been loaded onto the trays 16, the user closes the trays by swinging them to the closed position (FIGS. 1–2). The user then operates the controls of the device as illustrated in FIGS. 16 and 17 to control the electronic power and control components 50 which comprise a control system. FIG. 16 schematically illustrates the operation of the device, and FIG. 17 illustrates the control panel 18. FIG. 19 illustrates an alternate embodiment of the control panel 18.

The on-off switch 99 allows the user to control the power to the device. The food type selection control 100 allows the user to select a predetermined setting dependent on the type of food to be heated/warmed. As it applies to tortillas, the selection allows for either corn or flour. (Step 102). We have found by our taste tests that corn tortillas take longer to heat for optimum taste and texture than do flour tortillas. More specifically, we have found that corn tortillas should be heated about 50% to about 80% (and normally about 65%) longer than flour tortillas. For example, the preferred embodiment of the tortilla warmer uses about 1200 watts of power, and at this level of power flour tortillas should be heated for about 35 seconds, and corn tortillas should be heated for about 58 seconds. Accordingly, when the user sets the type selection control 100 for "corn" the device automatically heats the tortillas 65% longer than if the user sets the control 100 for "flour." In an alternative embodiment, instead of varying the time, the time could be the same for both corn and flour while the power could be varied so that more power is used for corn tortillas than for flour tortillas, preferably, about 50% to about 80% more power. In either case, the important factor is that for corn tortillas more heat should be applied than for flour tortillas. As another alternative, the selection may include settings for the Pita or other food which is denoted as "other" on FIG. 16. After the predetermined heating time has been completed the control system shuts off power to the heating elements 46 and causes a sound to alert the user. (Step 116).

The timing adjustment control 104 allows the user to vary the amount of time the food will be heated. The timing adjustment control 104 allows the user to select from a predetermined minimum or maximum amount of time (or any amount of time in between) programmed in the control circuitry. (Step 106) For example, if the user selects "corn" with the selection control 100, the user can then vary the exact heating time with the timing adjustment control 104 so that the time is the preset value for "corn" or somewhat greater or lesser than the preset time depending on the user's preference. The quantity selection control 108 is an energy saving feature. The user may elect to heat only the three upper most chambers or all six depending on estimated consumption. (Step 110) For example, a person preparing a meal for him or herself may only consume 2 to 3 tortillas versus a family of four that may consume 6 to 12. The start button 112 allows for the user to begin the heating process once all selections have been made. (Step 114).

Figure 18:
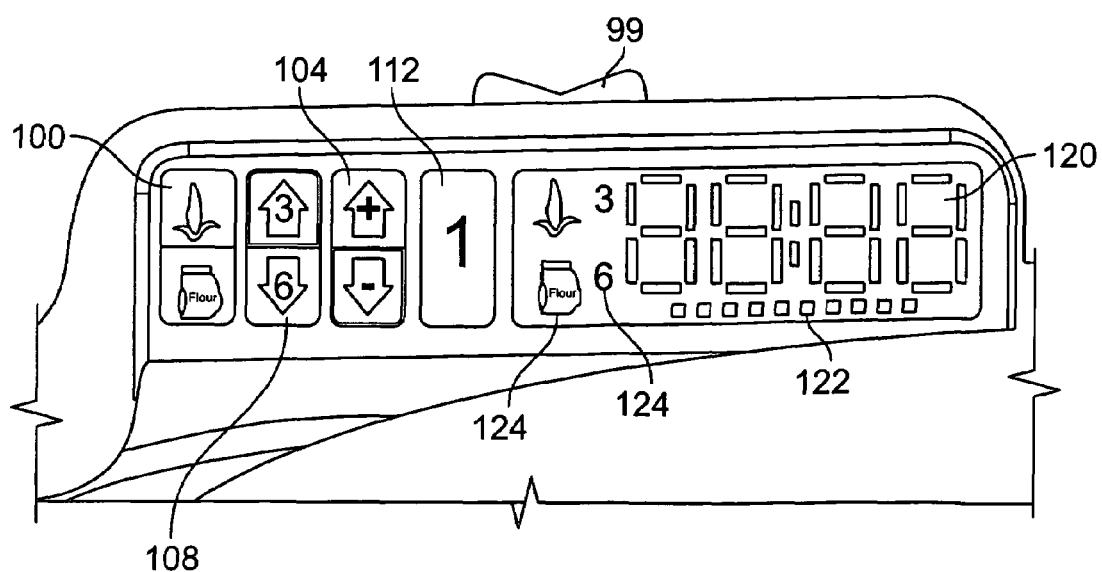
FIG. 18 illustrates an alternative embodiment of the control panel of the device of FIG. 1.

FIG. 18 illustrates an alternative embodiment of the control panel 18. This alternative embodiment differs from the FIG. 17 embodiment primarily in that the FIG. 18 embodiment includes a timer countdown LCD display 120 and a timing/heat intensity LCD display 122. Also, the FIG. 18 embodiment provides visual feedback of the user's selections with indicators 124.

FIGS. 19–24 show an alternative embodiment in which the tortillas are heated by conduction. This embodiment is similar in some respects to the embodiment described above, and similar features will not be repeated in the following discussion of this embodiment. The conductive-type tortilla warmer shown in FIGS. 19–24 includes a housing 130 with a hinged door 132, and a control panel 18 is mounted on the top of the housing 130. Seven heating plates 134 are located inside the housing 130, and in FIG. 19 the heating plates 134 are shown in the open position, while in FIG. 20 the heating plates are shown in the closed position.

Figure 21:
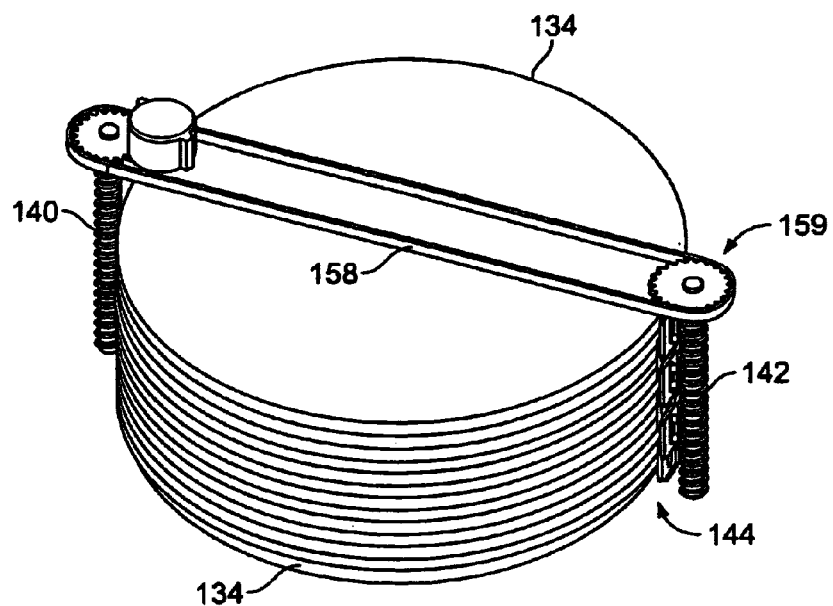
FIG. 21 is an internal view of the device of FIG. 19.
Figure 22:
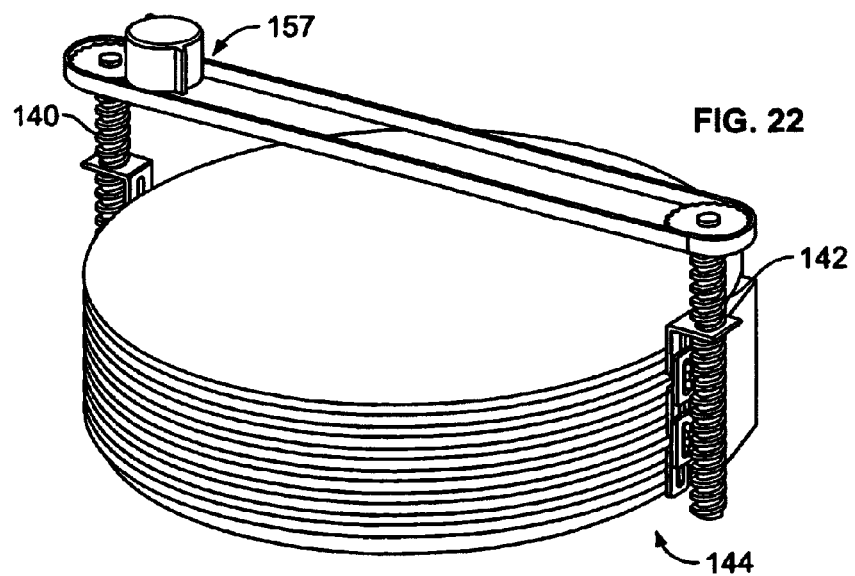
FIG. 22 is an internal view of the device of FIG. 20.
Figure 23:
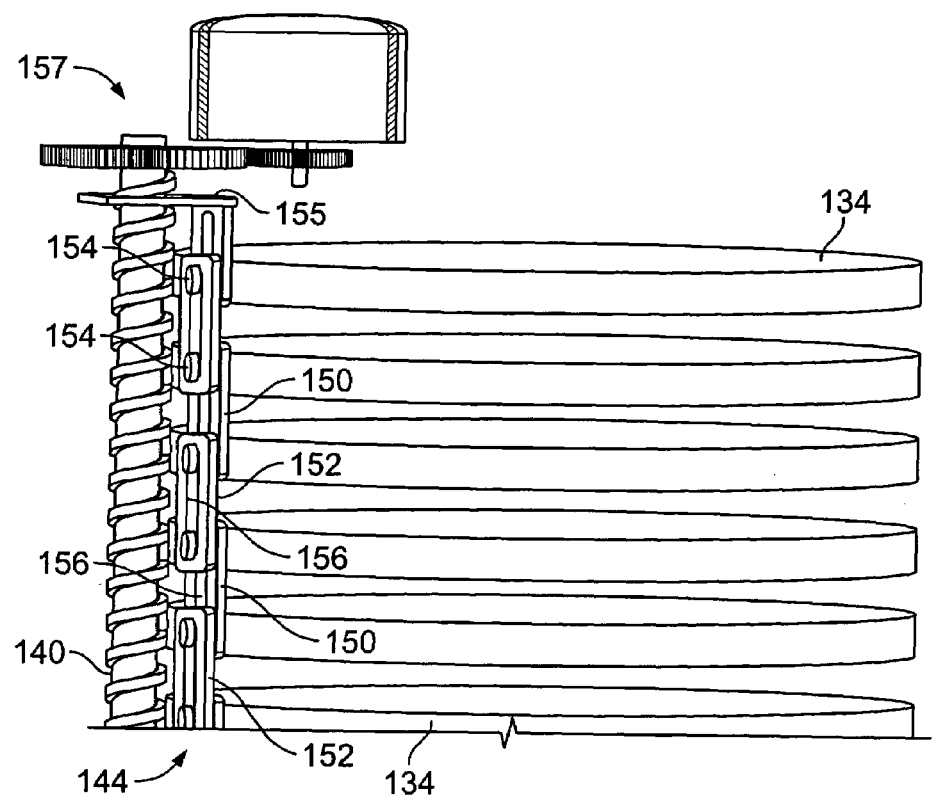
FIG. 23 is an internal view of a part of the device of FIG. 19.

FIGS. 21–23 show the heating plates 134 and the system to open and close them. Adjacent the plates 134 a first and second jack screw 140 and 142 are located. The jack screws 140 and 142 are connected to the plates 134 by linkages 144. The linkages 144 are formed of a plurality of inner links 150 and outer links 152, and each linkage 144 is connected to the plates 134 by pins 154. Two pins 154 are mounted on each plate 134, and the pins slide in slots 156 formed in the inner and outer links 150 and 152. The uppermost outer links 152 adjacent each jack screw 140 and 142 are connected to a threaded connector 155 which in turn is in threaded engagement with the adjacent jack screw 140 or 142. A motor and gear system 157 is located above the plates 134 to drive the jack screw 140, and the motor and gear system 157 is connected by a toothed belt 158 to a gear 159 to drive jack screw 142. In operation, the motor and gear system 157 can drive the jack screws 140 and 142 to raise and separate all the heating plates 134 from each other (FIG. 21) so that a user can insert tortillas between the plates. Then the motor can be operated in the reverse direction to lower the plates 134 until the bottom plate contacts the floor of the device, and then each of the other plates 134 is lowered to contact the food on the plate 134 below (FIG. 22). Then the plates 134 are heated to warm the tortillas by conduction.

Figure 24:
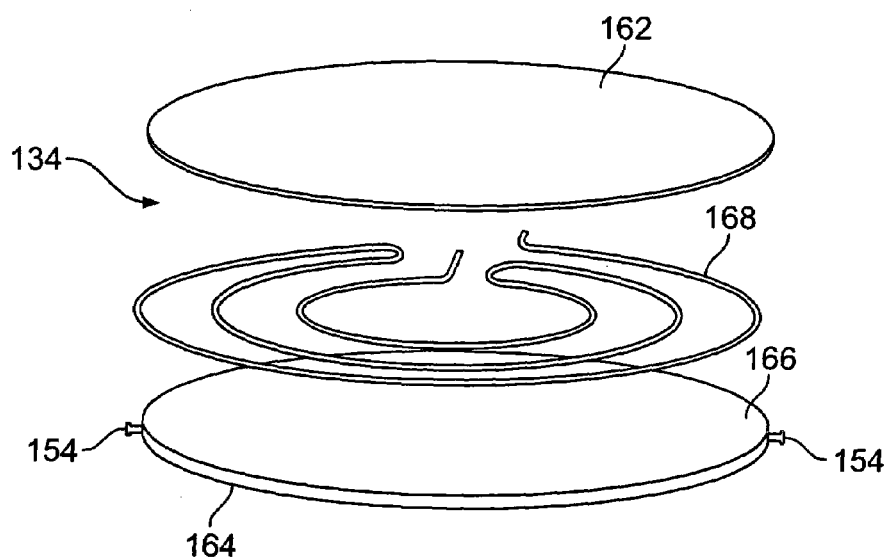
FIG. 24 is an exploded view of part of the device of FIG. 19

As shown in FIG. 24 each heating plate 134 includes an upper cylindrical plate 162 and a lower cylindrical plate 164 which has a lip 166 around its periphery. A resistive heating element 168 is located between the plates 162 and 164 to heat the plates.

Figure 25:
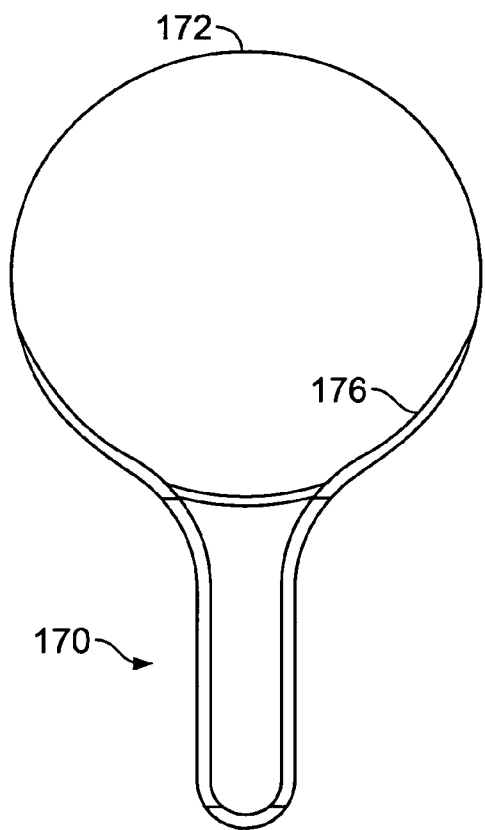
FIG. 25 is top view of a novel tortilla spatula.
Figure 26:
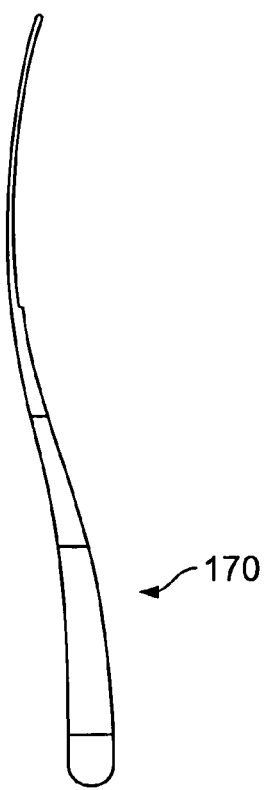
FIG. 26 is side view of the novel tortilla spatula of FIG. 25.

Turning now to FIGS. 25 and 26 a novel tortilla spatula 170 is shown. The tortilla spatula includes a flat portion 172 and a handle 174, and a raised portion 176 is formed partially around the periphery of the spatula to provide mechanical strength. The tortilla spatula 170 can be used to insert tortillas into the tortilla warmer 10 and remove them from the device.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A device for heating food, comprising:
   a. a support;
   b. a first heating member coupled to said support;
   c. a first tray rotatably coupled to said support so that said first tray can be located below said first heating member when said first tray is in a closed position and said first tray can be located not below said first heating member when said first tray is in an open position; and,
   d. a first compression grill located between said first tray and said first heating member when said first tray is in the closed position.

2. A device for heating food according to claim 1, further comprising:
   a. a second heating member coupled to said support;
   b. a second tray coupled to said support, said second tray being located below said second heating member; and,
   c. a second compression grill located between said second tray and said second heating member.

3. A device for heating food according to claim 2, wherein said second heating member is located below said first tray.

4. A device for heating food comprising:
   a. a support;
   b. a first heating member coupled to said support;
   c. a first tray coupled to said support and located below said first heating member;
   d. a first compression grill located between said first tray and said first heating member.
   e. a second heating member coupled to said support and located below said first tray;
   f. a second tray coupled to said support, said second tray being located below said second heating member; and,
   g. a second compression grill located between said second tray and said second heating member;
wherein said second heating member provides radiant heat directed upward toward said first tray and downward toward said second tray.

5. A device for heating food according to claim 1, wherein said compression grill is constructed to permit radiant heat to pass there through while preventing food located on said first tray from expanding to contact said first heating member.

6. A device according to claim 1 further comprising spacing means coupled to said first tray and to said first compression grill to maintain said first tray and said first compression grill spaced apart from each other a predetermined distance when the first tray is in the closed position.

7. A device according to claim 6 wherein said spacing means is constructed and arranged to maintain said first tray spaced below said first heating member a predetermined distance when the first tray is in the closed position.

8. A device for heating food items, comprising:
a. a support;
b. a plurality of heating plates coupled to said support;
c. means to separate the heating plates to allow a user to place a food item on each plate; and,
d. means to compress the heating plates against the food items between them;
e. said means to separate the heating plates and said means to compress the heating plates comprising a jack screw to raise the plates and lower the plates.

9. A device for heating food according to claim 8 comprising linkage connecting the jack screw to the plates.

* * * * *